United States Patent [19]

Hochstein

[11] Patent Number: 4,703,237

[45] Date of Patent: Oct. 27, 1987

[54] RAIN SENSOR

[76] Inventor: Peter A. Hochstein, 2966 River Valley Dr., Troy, Mich. 48098

[21] Appl. No.: 879,265

[22] Filed: Jun. 27, 1986

[51] Int. Cl.$^4$ ............................................... B60S 1/08
[52] U.S. Cl. .................................... 318/483; 318/444; 318/DIG. 2; 15/250 C
[58] Field of Search ............... 318/443, 444, 483, 643, 318/DIG. 2, 445, 449, 452, 484, 487; 15/250 C, 250.12, 250.13; 307/10 R; 200/61.04, 61.05

[56] References Cited

U.S. PATENT DOCUMENTS 2,607,828  8/1952  Razek ............................... 318/643 X
4,554,493 11/1985  Armstrong ........................... 318/444
4,613,802  9/1986  Kraus et al. ..................... 307/10 R X Primary Examiner—William M. Shoop, Jr.
Assistant Examiner—Bentsu Ro
Attorney, Agent, or Firm—Harold W. Milton, Jr.

[57] ABSTRACT

A rain sensor for selectively supplying power from a constantly available power source to a wiper means (14) to remove moisture from a vehicle window (12) when moisture has collected. A passive circuit (18) is supported on the window (12) and has an initial self-resonant frequency to sense moisture. A generating means (20,120) creates an electromagnetic field having a range of frequencies wherein the initial self-resonant frequency is within the range of frequencies. An moisture collects about the passive circuit (18), the resonant frequency of the passive circuit (18) shifts away from the initial self-resonant frequency, indicative of less coupling with the generating means (20,20). A detector (28,128) detects the coupling between the passive circuit (18) and the generating means (20,120) to actuate the wiper means (14) by a control means (30,130) when a predetermined decoupling magnitude is exceeded.

34 Claims, 4 Drawing Figures

U.S. Patent    Oct. 27, 1987    Sheet 1 of 3    4,703,237

RAIN SENSOR

TECHNICAL FIELD

The invention relates to a automatic windshield wiping assembly for a vehicle which energizes the wipers when moisture is sensed.

BACKGROUND ART

Windshield wipers are manually controlled by the driver of a vehicle when rain or moisture has accumulated on a window. A driver must repeatedly actuate a wiper control in a light drizzle condition when continuous-on wiping is inappropriate. Thus there is a need for automatic wiper systems which actuate the wipers only when moisture is detected and which does not require manual actuation.

Assemblies for automatically energizing a wiping system on a vehicle have included a control circuit to sense a variable amount of moisture on the surface of a window. Such circuits have included capacitive sensors situated on the exterior of the window of a vehicle which are responsive to water droplets. When moisture collects on the window, the capacitance is changed. The change in capacitance is detected which in turn energizes a wiper means.

One type of such assembly includes a pair of parallel sensor wires extending from the exterior of window to a detecting circuit within a vehicle. The detecting circuit includes an oscillator with a frequency proportional to the value of the capacitance created by the pair of sensor wires. As moisture collects on the window, the value of the capacitance changes which changes the frequency of oscillation. The change is frequency is detected by a frequency to voltage convertor which sends a d.c. signal to a comparator to compare the d.c. signal to a reference voltage and actuate a wiper means if lower. The U.S. Pat. No. 4,554,493 granted Nov. 19, 1985 in the name of Howard L. Armstrong discloses such a capacitive sensing assembly. The problem with this assembly is that leads extend from the sensor to the control circuit.

SUMMARY OF THE INVENTION AND ADVANTAGES

The invention provides a windshield wiping assembly for use in a vehicle for selectively supplying power from a constantly available power source to a wiping means for removing moisture from a window when moisture has collected. The assembly includes wiper means for removing moisture from the window. The assembly is characterized by a wiping control circuit which includes generating means for generating an electromagnetic field in a range of frequencies. A passive circuit means is supported by the window and has an initial self-resonant frequency in the range of frequencies and is responsive to moisture on the window for shifting the resonant frequency away from said initial self-resonant frequency in proportion to the amount of moisture. A detecting means detects coupling between the generating means and the passive circuit means for producing a proportional signal indicative of the degree of shift of the resonant frequency. A control means actuates the wiper means when the proportional signal exceeds a predetermined magnitude.

The present invention solves the problems of the prior art by eliminating lead-in conductors extending from the moisture sensing means on the outside of the window to the control circuit which is sensitive to a low amount of moisture.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF PREFERRED EMBODIMENT

Figure 2:
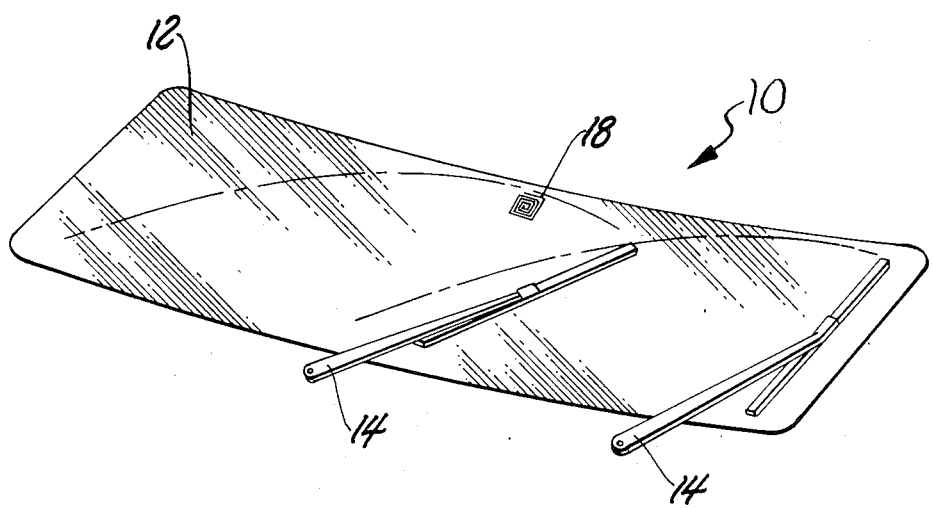
FIG. 2 is a perspective view of the subject invention in application.
Figure 3:
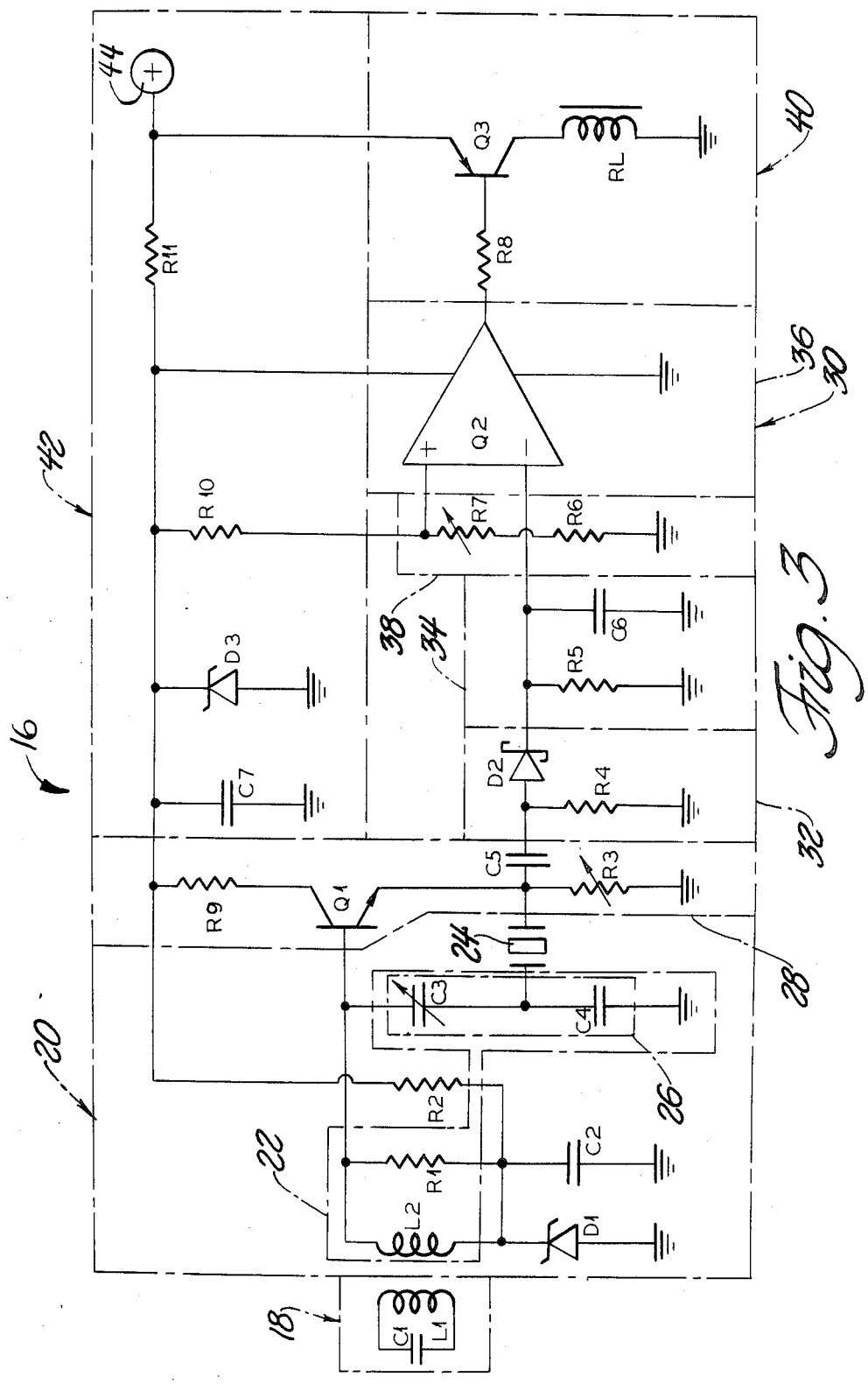
FIG. 3 is a circuit diagram of the subject invention.

A windshield wiping assembly for use in an automotive vehicle for selectively supplying power from a constantly available power source to a wiping means to remove moisture from a window when moisture has collected is generally shown at 10 in FIG. 2. A vehicle body contains or supports a window windshield 12 and wiper means 14 for removing moisture from the window 132. Actuation of the wiper means 14 is initiated by a wiping control circuit 16, 116 coupling to a passive circuit means 18.

Figure 1:
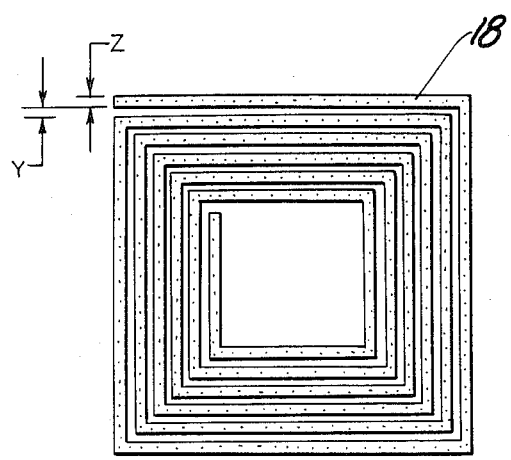
FIG. 1 is the geometry of the passive circuit of the subject invention.

The passive circuit means 18 is supported by the window and has an initial self-resonant frequency. The passive circuit means 18 is responsive to moisture on the window 12 for shifting the resonant frequency away from the self-resonant frequency in proportion to the amount of moisture. As shown in FIG. 1, the passive circuit means 18 is in the form of a thin planar spiral conductor on the exterior of the window 12 which produces a capacitance C1 between adjacent turn and a coil inductance L1 dependant on geometry and size of the spiral to sense moisture. as will be appreciated by those skilled-in-the-art, the passive circuit means 18 can take other forms. The moisture exhibits a high dielectric constant (equal to 80) wherein the glass 12 has a very low dielectric constant (aproximately between 5 and 8). Therefore, the capacitance C1 is a function of the dielectric constant of the substrate, or glass as in the invention, and the thickness. The passive circuit means 18 can be situated directly behind the rear view mirror of a vehicle so that it will not distort the vision of a driver. At this location, the passive circuit means 18 would be in the path of the wiper means 14 which will remove the moisture from the passive circuit 18 to return the resonant frequency back to the initial self-resonant frequency. A preferred embodiment of the passive circuit 18 is silver-palladium fritted conductors in the spiral configuration which are screen printed and fired into the outer glass surface to provide sensitivity as well as abrasion resistance. Other embodiments of the passive circuit may be printed, die-cut or etched and placed on the inside of windshield or within laminated glass. As shown in FIG. 2, the passive circuit means 18 is made of a 6 turn, 10 $\mu$m thick silver-palladium conductor on 6 mm glass substrate with a gap between turns of 1.0 mm (y) and conductor width of 1.5 mm (z). The resonant frequency of this configuration is 70 MHz with a 1 $\mu$H inductance and 5.17 pF capacitance. The passive circuit means 18 resonates at the initial self-resonant frequency when excited by an electromagnetic field having frequency equal to the self-resonant frequency. At resonance the passive circuit 18 extracts radio frequency energy from the exciting electromagnetic field.

The wiping control circuit 16, 116 includes a detecting means 28, 128 which detects coupling between the generating means 20, 120 and the passive circuit means 18 to produce a proportional signal indicative of the degree of shifting of the resonant frequency due to moisture away from the initial self-resonant frequency producing a proportional signal. In other words, the detecting means 28,128 senses the degree of radio frequency energy extracted from the field.

A control means 30, 130 is used for actuating the wiper means 14 when the proportional signal exceeds a predetermned magnitude. A comparator 36,50 compares the proportional signal to the predetermine magnitude to produce a drive signal to actuate the wiper means 14 when the proportional signal exceeds the predetermined magnitude. A sensitivity control means 38,52 varies the predetermined magnitude to adjust the amount of moisture required to actuate the wiper means 14. A switch 40,140 receives the drive signal to actuate the wiper means 14.

The wiping control circut 16,116 can be implemented by two different embodiments. The first embodiment 16 uses a fixed frequency generating means 20 and the second embodiment 116 uses a frequency swept generating means 120.

The first embodiment 16 includes the generating means 20 which is used to generate the electromagnetic field at a single predetermined frequency which is equal to the initial self-resonant frequency to the passive circuit. The generating means 20 is situated in proximity of the passive circuit means 18 to enhance coupling, such as at the base of the rear view mirror when the passive circuit means 18 is on the glass 12 in front of the rear view mirror. The generating means 20 includes an exciting oscillator tank 22 for coupling to the passive circuit 18 when energized. A crystal 24 is used for generating the predetermined frequency which is stable over a wide range of temperatures. A capacitance divider 26 is used in conjunction with the crystal 24 to resonate at the predetermined frequency. An exciting oscillator tank coil L2 resonates with the capacitance divider 26 and couples to the passive circuit means 18. The tank coil L2 couples to the passive circuit 18 by induction. The mounting of the oscillator tank coil L2 in proximity to the passive circuit 18 is sufficient to induce coupling by induction. Slight variations in the capacitance of the passive circuit 18 change the self-resonant frequency by significant measureable amounts. As an example, only 0.2 pF of added capacity would shift the resonant frequency downwards in excess of 1.3 MHZ. This shift is easily detected.

The detecting means 28 is used to detect the magnitude of coupling between the generating means 20 and the passive circuit means 18 which produces the proportional signal indicitive of the degree of shift of the self-resonant frequency due to moisture away from the initial self-resonant frequency. An oscillator transistor Q1 is connected as a modified Butler overtone crystal oscillator. The base drive to the oscillator transistor Q1 is derived from the oscillator tank 22. When energy is coupled out of the oscillator tank 22 through inductive coupling with the passive circuit means 18, the emitter current of the oscillator transistor Q1 undergoes a proportionate decrease. Maximum energy is coupled out of the oscillator tank 22 when the initial self resonant frequency of the passive circuit means 18 is equal to or nearly equal to the frequency of the generating means 20. As the self-resonant frequency of the passive circuit means 18 is shifted towards a lower frequency by moisture, coupling with the generating means 20 is decreased, resulting in greater base drive for the oscillator transistor Q1, thereby increasing the emitter current proportionately with the degree of decoupling. Thus, the radio frequency voltage at the emitter of the oscillator transistor Q1 varies proportionately with the degree of moisture present on the passive circuit means 18, which causes a shift in the selfresonant frequency therein.

The control means 30 actuates the wiper means 14 when the proportional signal due to a frequency shift of the self-resonant passive circuit means 18 exceeds the predetermined magnitude. A rectifying means 32 detects and converts the proportional radio frequency voltage to a proportional d.c. level. Filter means 34 removes any remaining radio frequency components of the detected signal and integrates the d.c. level to minimize rapid changes in level due to spurious signals or events. Control means 30 further includes the comparator 36 for comparing the proportional detected d.c. level to a predetermined magnitude. The sensitivity control means 38 is a comparator set point control. The sensitivity control means 38 varies the predetermined magnitude to adjust for the amount of moisture required to actuate the wiper means 14. Whenever the predetermined magnitude is exceeded, the switch 40 is energized. Upon exceeding the predetermined magnitude, the output of comparator 36 goes low, thereby driving a switching transistor Q3 into conduction. The switching transistor Q3 then drives a relay RL to close the contacts which actuates the wiper means 14. The sensitivity control means 38 uses a variable resistor R7 to vary a voltage divider to set the predetermined magnitude to which the proportional signal is compared.

A power supply circuit 42 applies power to and protects the assembly. The power supply circuit receives voltage from the battery 44 of a vehicle.

During fabrication, the very high Q of the passive circuit means 18 makes it difficult to precisely resonate the frequency at the predetermined frequency. Therefore, a tuning capacitor can be used, not shown. The passive circuit 18 is created to be resonant at a slightly higher frequency than the predetermined frequency. Padding the circuit with a simple capacitor solves the problem for tuning the passive circuit to the predetermined frequency. The capacitive padder is fully isolated from the circuitry. The added distributed capacity is a function of the proximity of the adjustable pad to the inductor conductors. As the self-capacitance of the tuned circuit is increased, the resonant frequency is lowered to the desired value. The adjustable capacitor plate may be either a vane or screw-driven for finer more precise setting.

The specific circuitry of the first embodiment includes the exciting oscillator tank 22 being the tank coil L2 connected in parallel with a first resistor R1 and also connected in parallel with tank capacitors C3,C4. The capacitor divider 26 includes the tank capacitors C3,C4 tapped by the crystal 24 with the first resonant capacitor C4 connected to ground and the second resonant capacitor C3 connected to the tank coil L2. The oscillator transistor Q1 has the base connected to the tank coil L2 with a current limiting resistor R9 connected to the collector of the transistor Q1 and a feedback resistor R3 connected to the emitter of the transistor Q1 creating a path to ground.

The rectifier 32 includes a coupling capacitor C5 connected to the emitter of the oscillator transistor Q1 and a fourth limiting resistor R4 connected between the coupling capacitor C5 and ground. A Schottky diode D2 is connected to the coupling capacitor C5 for rectifying the signal. The filter 34 includes a filter resistor R5 connected between the output of the rectifier 32 and to ground, and a filter capacitor C6 connected in parallel with the filter resistor R5.

The sensitivity control means 38 includes a fixed resistor R6 in series with the variable resistor R7. The comparator 36 includes a operational amplifier Q2 with the non-inverting input connected to the variable resistor R7 and the inverting input connected to the output of the filter 34. The switch 40 includes a switch current limiting resistor R8 connected to the output of the operational amplifier Q2, and a switching transistor Q3 with the base connected to the switch current limiting resistor R8. A relay RL is connected between the emitter of the transistor Q3 and ground.

The power supply circuit 42 includes a voltage source being a vehicle battery 44 which is connected to the collector of the switching transistor Q3. A second current limiting resistor R11 is connected to the voltage source 44. A third limiting resistor R10 is connected between the second current limiting resistor R11 and the variable resistor R7. A second zener diode D3 is connected to the third limiting resistor R10. A power decoupling capacitor C7 is connected in parallel with the second zener diode D3, and the current limiting resistor R9 is connected to the decoupling capacitor C7. A sixth current limiting resistor R2 is connected to the fifth limiting resistor R9. A first zener diode D1 is connected in parallel with a first decoupling capacitor C2 which is connected to the sixth limiting resistor R2.

In general, when energy is coupled out of the exciting coil L2, less base drive is available to the oscillator transistor Q1 which causes a reduction in voltage at the emitter of the oscillator transistor Q1. A nominally 1 V.p.p., 70 MHz RF voltage at the emitter is capacitively coupled by means of the coupling capacitor C5 and the fourth limiting resistor R4 to the Schottky diode D2 where the signal is rectified and filtered. The resulting d.c. level is a function of the degree of coupling between the exciting oscillator tank coil L2 and the passive circuit 18. Over coupling as the resonant frequency may result in cessation of oscillation, and essentially a zero digital voltage at the output of the detector. As moisture detunes the passive circuit off the predetermined frequency, coupling decreases, and the oscillator's 22 detected output voltage increases.

Figure 4:
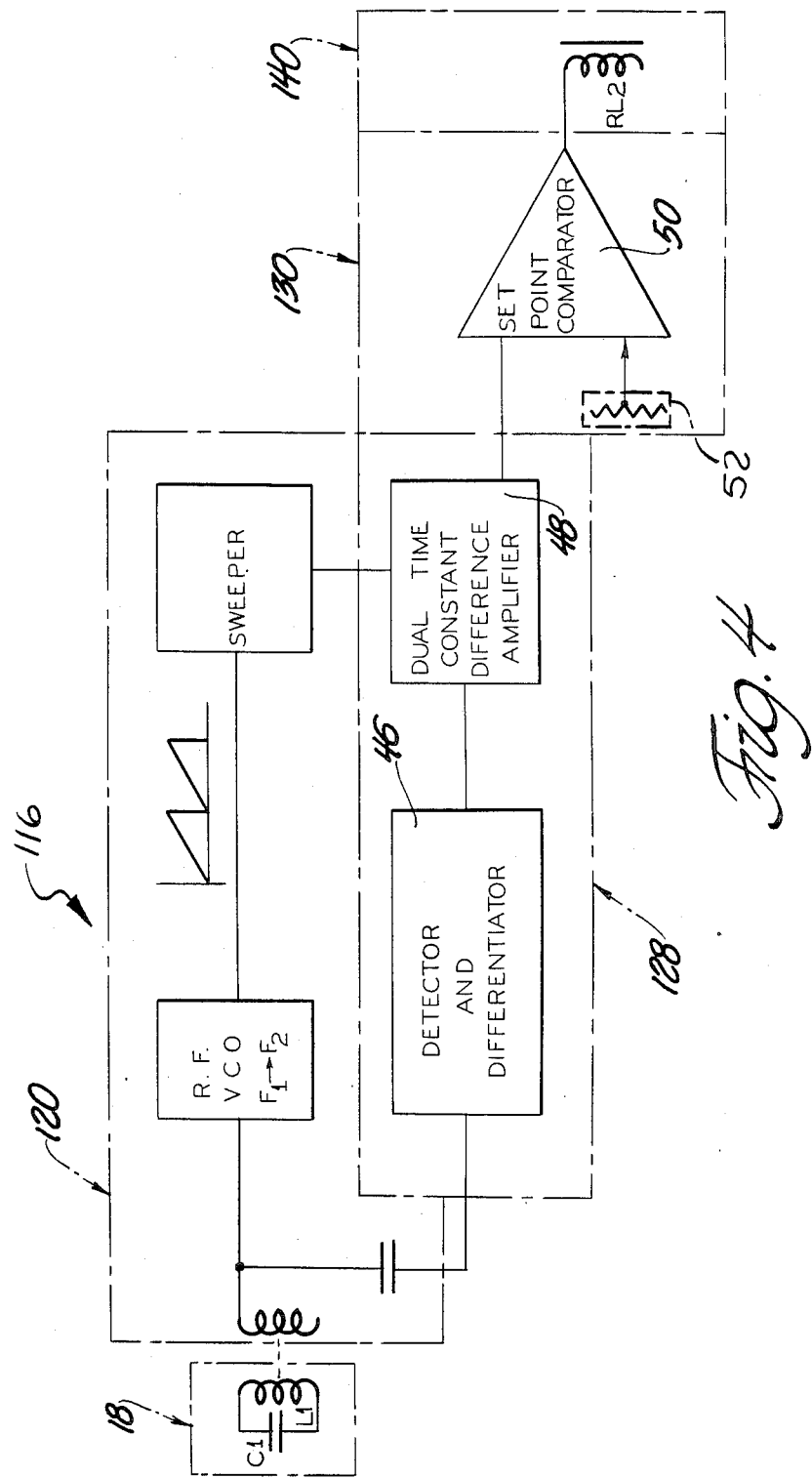
FIG. 4 is a block diagram of an alternate embodiment of the subject invention.

As shown in FIG. 4, a second embodiment 116 of measuring the absorption of energy by the passive circuit 18 uses the generating means 120 which is a swept frequency, voltage-controlled radio frequency oscillator 120 which couples to the passive circuit 18. The oscillator 120 is controlled by a digital voltage ramp in a sawtooth configuration, wherein the increasing range of predetermned frequencies is proportional to the increasing voltage levels of the sawtooth. As an example, at 1 v.d.c. the oscillator 120 frequency will be 98 M Hz and as the frequency sweeps through the range of predetermined frequencies, the last voltage and frequency will be at 10 v.d.c. and 102 M Hz. After the highest voltage and frequency, the cycle is repeated starting with the lowest voltage and frequency. When the oscillator 120 passes the initial self-resonant frequency of the passive circuit means 18, an absorption dip occurs. The detection means 128 detects the dip through a differentiator 46, which identifies a given frequency and sweep voltage responsible for the absorption dip. A dual time constant difference amplifier circuit 48 continuously monitors the change in dip voltage by means of dual time constant integrators. The instantaneous change in dip voltage is compared to previous sweep cycles and if the compared level exceeds the predetermined magnitude, the control means 130 will activate the switch 140 causing wiper means 14 to be energized. The comparator means 50 uses the sensitivity control means 52 to adjust the predetermined magnitude so that a given amount of moisture must collect on the window 12 before the control means 130 will activate. A switch 140 includes a relay RL2 to actuate the wiper means 14 when moisture has collected on the window 12.

The advantage of this swept frequency absorption oscillator approach is that the fabrication of the passive circuit means 18 is completely non-critical. Slow changes in the dry, initial self-resonant frequency of the moisture sensor are not detrimental to the operation of the system. Furthermore, drift of a fixed frequency oscillator is no longer of concern.

The relay RL,RL$_2$ closure need only be momentary in either embodiment 16, 116. These rain sensing automatic control would interface with existing integral cycle automotive wiper systems.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A windshield wiping assembly for use in a vehicle for selectively supplying power from a constantly available power source to a wiper means (14) for removing moisture from a window when moisture has collected, said assembly comprising; a window (12), wiper means (14) for removing moisture from said window (12), said assembly characterized by a wiping control circuit (16) including generating means (20, 120) for generating an electromagnetic field over a range of frequencies, passive circuit (18) means supported by said window (12) and having an initial self-resonant frequency in said range of frequencies and being responsive to moisture on said window (12) for shifting the resonant frequency away from said initial self-resonant frequency in proportion to the amount of moisture, detecting means (28, 128) for detecting coupling between said generating means (20, 120) and said passive circuit means (18) for producing a proportinal signal indicative of the degree of movement of the resonant frequency due to moisture away from said self-resonant frequency, and control means (30, 130) for actuating said wiper means (14) when said proportional signal exceeds a predetermined magnitude.

2. An assembly as set forth in claim 1 further characterized by said control means (30,130) including a comparator (36,50) for comparing said proportional signal to said predetermined magnitude to produce a drive signal.

3. An assembly as set forth in claim 2 further characterized by said control means (30,130) including sensitivity control means (38,52) for varying said predetermined magnitude to adjust the amount of moisture required to actuate said wiper means (14).

4. An assembly as set forth in claim 3 further characterized by said control means (30,130) including a switch (40,140) for receiving said drive signal to actuate said wiper means (14) when said proportional signal exceeds said predetermined magnitude.

5. An assembly as set forth in claim 4 further characterized by said passive circuit means (18) being a thin planar conductor applied to said window (12) to define a tuned circuit to resonate at said initial self-resonant frequency when excited by said electromagnetic field by extracting energy from said generating means (20, 120).

6. An assembly as set forth in claim 5 further characterized by said generating means (20) generating a single predetermined frequency wherein said predetermined frequency equals said initial self-resonant frequency of said passive circuit means (18).

7. An assembly as set forth in claim 6 further characterized by said proportional signal representing the magnitude of coupling between said generating means (20,120) and said passive circuit means (18).

8. An assembly as set forth in claim 7 further characterized by said generating means (20) including an exciting oscillator tank (22) for coupling to said passive circuit means (18) when energized, said oscillator tank (22) being oscillated at said predetermined frequency and being in proximity of said passive circuit means (18).

9. An assembly as set forth in claim 8 further characterized by said control means (30) including a rectifier (32) for converting said proportional signal into a d.c. signal.

10. An assembly as set forth in claim 9 further characterized by said generating means (20) including a crystal (24) for generating said predetermined frequency.

11. An assembly as set forth in claim 10 further characterized by said control means (30) including a filter means (34) for filtering out unwanted frequencies from said d.c. signal.

12. An assembly as set forth in claim 11 further characterized by said generating means (20) including an oscillator transistor (Q1) wherein said exciting oscillator tank (22) drives said oscillator transistor (Q1) to said proportional signal indicative of the degree of shift of the resonant frequency due to moisture away from said initial self-resonant frequency.

13. An assembly as set forth in claim 12 further characterized by said generating means (20) including a capacitor divider (26) for controlling and resonanting with said exciting oscillator tank (22) at said predetermined frequency.

14. An assembly as set forth in claim 13 further including a power supply circuit (42) for supplying power to and protecting said wiping control circuit (16).

15. An assembly as set forth in claim 14 further characterized by said exciting oscillator tank (22) including a tank coil (L2) connected in parallel with a first resistor (R1) and also connected in parallel with a pair of tank capacitors (C3,C4).

16. An assembly as set forth in claim 15 further characterized by said tank capacitors (C3,C4) including said tank capacitors (C4,C3) tapped by said crystal (24) with the first of said tank capacitors (C4) connected to ground and the second of said tank capacitors (C3) connected to said tank coil (L2) for resonating therewith at said predetermined frequency.

17. An assembly as set forth in claim 16 further characterized by said oscillator transistor (Q1) having the base connected to said tank coil (L2), and a fifth current limiting resistor (R9) connected to the collector of said transistor (Q1) and a feedback resistor (R3) connected to the emitter of said oscillator transistor (Q1) creating a path to ground.

18. An assembly as set forth in claim 17 further characterized by said rectifier (32) including a coupling capacitor (C5) connected to the emitter of said oscillator transistor (Q1), a fourth current limiting resistor (R4) connected to said coupling capacitor (C5) and to ground, and a Schottky diode (D2) connected to said coupling capacitor (C5) for rectifying said proportional signal.

19. An assembly as set forth in claim 18 further characterized by said filter means (34) including a filter resistor (R5) connected to the output of said Schottky diode (D2), and a filter capacitor (C6) connected in parallel with said filter resistor (R5) and to ground.

20. An assembly as set forth in claim 19 further characterized by said sensitivity control means (38) including fixed resistors (R6,R10) in series with a variable resistor (R7) forming a voltage divider.

21. An assembly as set forth in claim 20 further characterized by said comparator (36) including an operational amplifier (Q2) with the non-inverting input connected to said variable resistor (R7) and the inverting input connected to the output of said filter means (34).

22. An assembly as set forth in claim 21 further characterized by said switch (40) including a switch current limiting resistor (R8) connected to the output of said operational amplifier (Q2), and a switching transistor (Q3) with the base connected to said switch current limiting resistor (R8) and a relay (RL) connected to the emitter of said switching transistor (Q3).

23. An assembly as set forth in claim 22 further characterized by said power supply circuit (42) including a voltage source (44) being a vehicle battery connected to the collector of said switching transistor (Q3), a second current limiting resistor (R11) connected to said voltage source, a third current limiting resistor (R10) connected between said second current limiting resistor (R11) and said variable resistor (R7), a second zener diode (D3) connected to said third current limiting resistor (R10), a power decoupling capacitor is connected (C7) in parallel with said second zener diode (D3), said fifth current limiting resistor (R9) connected to said decoupling capacitor (C7), a sixth current limiting resistor (R2) is connected to said fifth current limiting resistor (R9), and a first zener diode (D1) is connected in parallel with a first decoupling capacitor (C2) which is connected to said sixth current limiting resistor (R2).

24. An assembly as set forth in claim 5 further characterized by said generating means (120) including a voltage controlled radio frequency oscillator (120) for oscillating over said range of frequencies producing said electromagnetic field.

25. An assembly as set forth in claim 24 further characterized by said detecting means (128) including a differentiator (46) for indicating absorption dips for producing a dip frequency related signal.

26. An assembly as set forth in claim 25 further characterized by said detecting means (128) including a dual time constant difference amplifier (48) for receiving said dip frequency related signal to integrate and to produce said proportional signal.

27. An assembly as set forth in claim 26 further characterized by said control means (130) including a comparator (50) for comparing said proportional signal to said predetermined magnitude to actuate said wiper means (14) when said proportional signal exceeds said predetermined magnitude.

28. A control circuit for selectively supplying power from a constantly available pwoer source to an actuating means when moisture is detected, said control circuit comprising; a generating means for generating an electromagnetic field at a predetermined frequency, passive circuit means for support in spaced relationship to said generating means and having an initial self-resonant frequency equal to said predetermined frequency and being responsive to moisture adjacent thereto for shifting the resonant frequency away from said initial self-resonant resonant frequency in proportional to the amount of moisture, detecting means for detecting the magnitude of coupling between said generating means and said passive circuit means for producing a proportional signal indicative of the degree of shift of the resonant frequency due to moisture away from said initial self-resonant frequency, and control means for providing a signal to the actuating means when said proportional signal exceeds a predetermined magnitude.

29. An assembly as set forth in claim 28 further characterized by said passive circuit means being a thin planar spiral conductor for producing a tuned circuit to resonate at said predetermined frequency when excited by said electromagnetic field by and extracting energy from said generating means.

30. An assembly as set forth in claim 28 further characterized by said detecting means including sensitivity control means for varying said predetermined magnitude.

31. An assembly as set forth in claim 28 further characterized by said detecting means including a comparator for comparing said proportional signal to said predetermined magnitude to produce a drive signal.

32. A window assembly for use with a control circuit for generating an electromagnetic field and for indicating the amount of coupling between a passive circuit and the control circuit to actuate a moisture removal means, said assembly comprising; a window upon which moisture accumulates for support in an automative vehicle, a passive circuit means supported by said window having an initial self-resonant frequency and being responsive to moisture for shifting the resonant frequency away from the initial self-resonant frequency whereby the control circuit will detect the amount of coupling.

33. An assembly as set forth in claim 32 further characterized by said window including at least two panes of glass and said passive circuit means being between said panes of glass to prevent abrasions to said passive circuit means and contact by the moisture removal means.

34. An assembly as set forth in claim 32 further characterized by said passive circuit being a thin planar conductor applied to said window to define a tuned circuit to resonate at said initial self-resonant frequency when excited by the control circuit.

* * * * *